Figure 1:
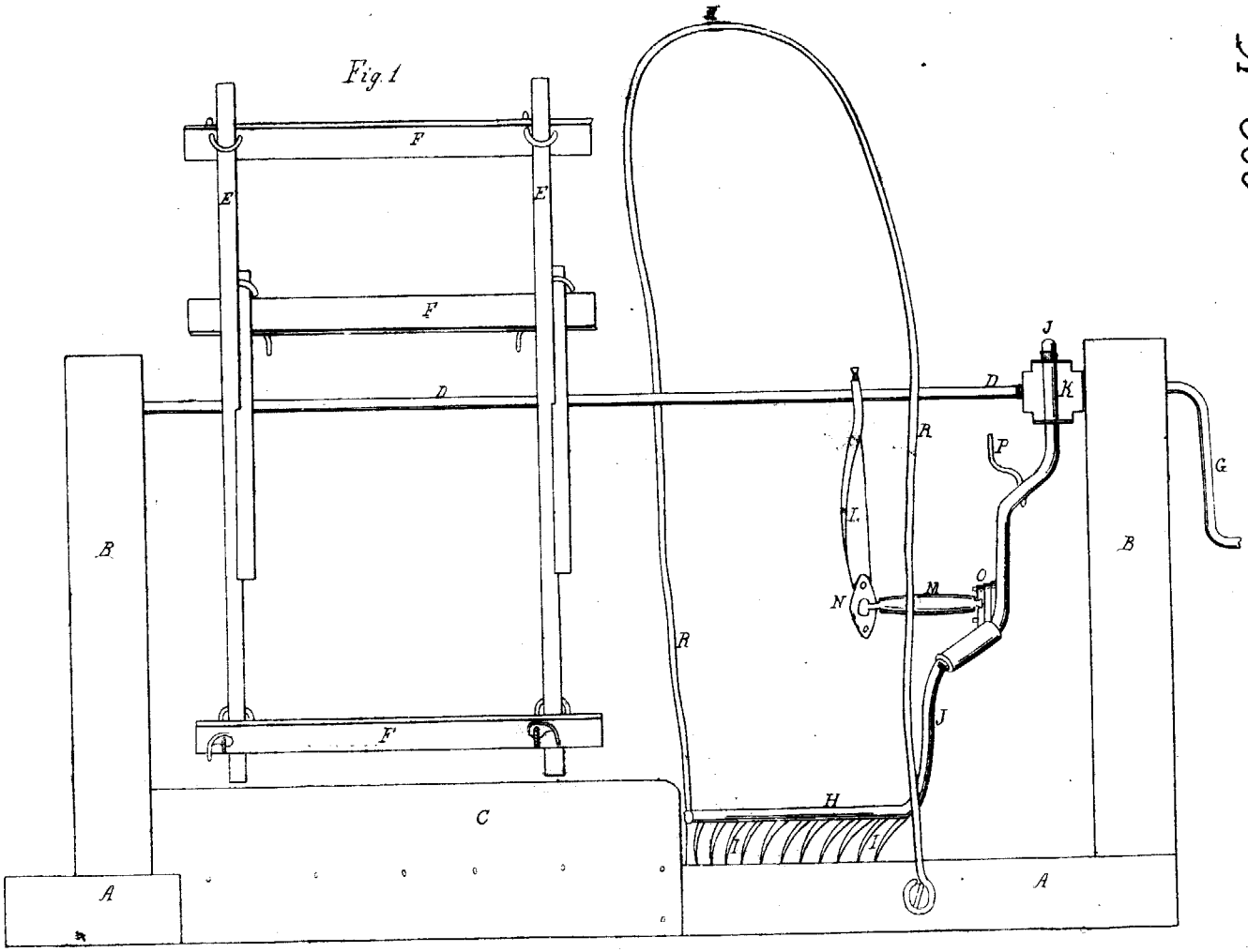

Sheet 1. 2. Sheets

McC. Young.

Harvester Rake.

No. 866

Reissued Dec. 13, 1859

Sheet 2. 2 Sheets
Mc C. Young.
Harvester Rake.
No. 866 Reissued Dec. 13, 1859
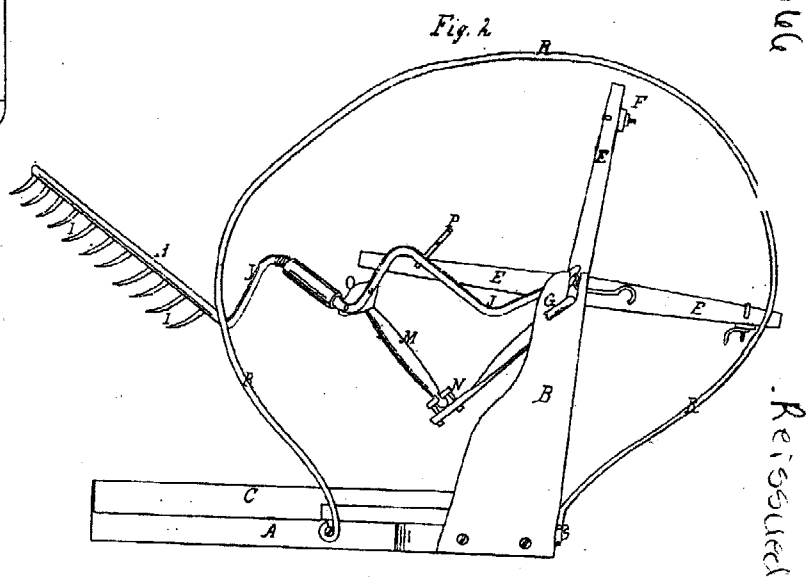
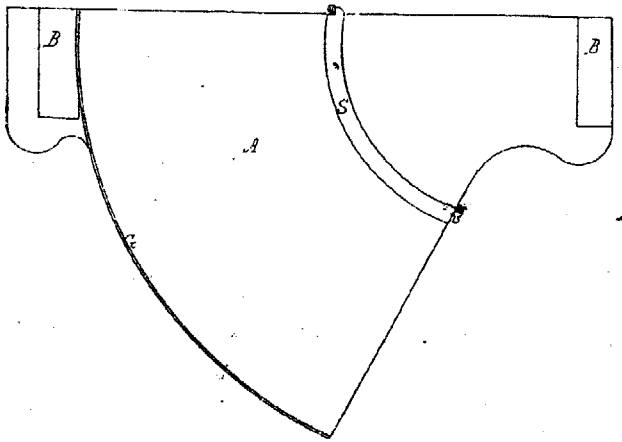
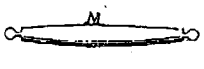

UNITED STATES PATENT OFFICE.

McCLINTOCK YOUNG, JR., OF FREDERICK, MARYLAND.

IMPROVEMENT IN HARVESTERS.

Specification forming part of Letters Patent No. 21,587, dated September 21, 1858; Reissue No. 779, dated July 19, 1859; Reissue No. 866, dated December 13, 1859.

*To all whom it may concern:*

Be it known that I, McCLINTOCK YOUNG, Jr., of the city and county of Frederick, and State of Maryland, have invented a new and improved raking apparatus for that description of harvesting-machines which are supplied with sector-shaped platforms; and I do hereby declare that the following is a full and exact description thereof, reference being had to the accompanying drawings, making a part of this specification.

Figure 1 is a rear elevation of the sector-shaped platform of a harvesting-machine and the apparatus connected therewith; Fig. 2, a top view of the same; Fig. 3, an end view; and Fig. 4, a separate view of the pitman M, which forms a portion of my improved raking apparatus.

Similar letters indicate like parts in each of the drawings.

My improvement in the raking apparatus of that description of harvesting-machines which is above referred to consists in my peculiar manner of connecting the revolving rake with its actuating-shaft, by which I produce two regularly-succeeding axial movements of the rake over and across the said platform—that is to say, an elevated curvilinear movement from rear to front over the platform, and a horizontal movement from front to rear upon or very near to the platform, substantially as hereinafter set forth. The aforesaid peculiar movements of the rake of my improved automatic raking apparatus enable the said rake to throw the cut stalks of grain in compact gavels from the inner edge of the platform into the path that has just been passed over by the team, and entirely beyond the reach of the team and of the machine during the succeeding movement of the same across the grain-field.

In the accompanying drawings, A marks the platform of the machine; B B, the stanchions, which support the reel-shaft D; C, the rim or guard around the curved portion of the platform; E E, the arms of the reel; F F, the gatherers of the reel; H, the rake-head; I I, the rake-teeth; J, the handle of the rake; K, a universal joint connecting the extremity of the rake-handle with the shaft D; L, an arm in the shaft D, which is secured in any desired position by means of the set-screw *a*. M is a pitman uniting the extremity of the arm L to the rake-handle J by means of the ball-and-socket joints N and O. The shape of the platform is clearly shown by Fig. 2.

The operation of the machine is as follows: As the machine is drawn along its path of progress the reel-shaft D is caused to revolve by any suitable gearing. The operation may be supposed to commence when the rake is at the inner edge of the platform, as shown in Fig. 2. The arm L and the pitman M cause the revolution of the shaft D to raise the rake along its guide R, and when it has attained its highest point it is conducted downward to the proper position for the arm L and pitman M to carry the said rake across the platform to the starting-point, and thus the operation is continued.

The gatherers F are secured to the arms of the reel-shaft by means of staples and set-screws in such a manner that the said gatherers may be adjusted to any desired position without varying the position of the reel-shaft.

When a harvesting-machine is furnished with a sector-shaped platform, and when the rake of said machine is automatically operated by means of power derived from a rotary shaft to which the handle of said rake is mechanically connected,

What I claim as my invention, and desire to secure by Letters Patent, is—

Giving the rake the two within-described regularly-succeeding axial movements over and across the platform of said machine—that is to say, an elevated curvilinear movement from rear to front over said platform, and a horizontal movement from front to rear upon or near to said platform by the means substantially as herein described, and for the purpose set forth.

McCLINTOCK YOUNG, JR.

Witnesses:

OTIS JOHNSON,

J. NEWMAN JOHNSON.